United States Patent
Shyvers

(10) Patent No.: US 12,393,518 B2
(45) Date of Patent: Aug. 19, 2025

(54) DETERMINISTIC MIXED LATENCY CACHE

(71) Applicant: Advanced Micro Devices, Inc., Santa Clara, CA (US)

(72) Inventor: Patrick J. Shyvers, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 729 days.

(21) Appl. No.: 17/489,741

(22) Filed: Sep. 29, 2021

(65) Prior Publication Data

US 2023/0101038 A1    Mar. 30, 2023

(51) Int. Cl.
*G06F 12/0891* (2016.01)
*G06F 1/08* (2006.01)
*G06F 3/06* (2006.01)
*G06F 12/02* (2006.01)

(52) U.S. Cl.
CPC ............ *G06F 12/0891* (2013.01); *G06F 1/08* (2013.01); *G06F 3/0611* (2013.01); *G06F 3/0659* (2013.01); *G06F 3/0673* (2013.01); *G06F 12/0238* (2013.01); *G06F 2212/1021* (2013.01)

(58) Field of Classification Search
CPC ............ G06F 12/0891; G06F 12/0238; G06F 12/0864; G06F 12/0888; G06F 12/0895; G06F 12/0846; G06F 3/0611; G06F 3/0659; G06F 3/0673; G06F 2212/1021; G06F 2212/1024; G06F 1/08
See application file for complete search history.

(56) References Cited

U.S. PATENT DOCUMENTS

| | | | | |
|---|---|---|---|---|
| 5,802,564 | A * | 9/1998 | Eickemeyer | G06F 12/0897 712/E9.023 |
| 6,374,344 | B1 * | 4/2002 | Webb, Jr. | G06F 12/0859 711/E12.051 |
| 7,293,141 | B1 * | 11/2007 | Donley | G06F 12/0895 711/100 |
| 10,719,434 | B2 * | 7/2020 | Reed | G06F 12/023 |
| 2004/0162947 | A1 | 8/2004 | Hooker | |
| 2006/0179222 | A1 | 8/2006 | Chung et al. | |
| 2011/0022773 | A1 * | 1/2011 | Rajamony | G06F 12/084 711/6 |
| 2014/0258618 | A1 * | 9/2014 | Novakovsky | G06F 12/0802 711/118 |
| 2020/0341536 | A1 * | 10/2020 | Waugh | G06F 1/3275 |
| 2021/0081331 | A1 * | 3/2021 | Lu | G06F 12/0811 |
| 2022/0066933 | A1 * | 3/2022 | Kamand | G06F 12/0864 |
| 2023/0101038 | A1 * | 3/2023 | Shyvers | G06F 3/0611 711/118 |

\* cited by examiner

*Primary Examiner* — Francisco A Grullon
(74) *Attorney, Agent, or Firm* — Volpe Koenig

(57) ABSTRACT

A method and processing device for accessing data is provided. The processing device comprises a cache and a processor. The cache comprises a first data section having a first cache hit latency and a second data section having a second cache hit latency that is different from the first cache hit latency of the first data section. The processor is configured to request access to data in memory, the data corresponding to a memory address which includes an identifier that identifies the first data section of the cache. The processor is also configured to load the requested data, determined to be located in the first data section of the cache, according to the first cache hit latency of the first data section of the cache.

20 Claims, 4 Drawing Sheets

DETERMINISTIC MIXED LATENCY CACHE

BACKGROUND

Cache memory (hereinafter "cache"), is used to accelerate access to data stored in a larger memory portion (e.g., main memory) by storing copies of data in the cache that are frequently accessed in larger memory portion. When a processor requests access (e.g., read data from or write data to) to the larger memory portion (e.g., identified by an address), the processor first determines whether a copy of the data is stored in the cache. If it is determined that a copy of the data is stored in the cache, the processor accesses the cache, facilitating a more efficient accessing of the data.

Frequently accessed data is copied from the memory to the cache in blocks of fixed size, typically referred to as cache lines. When a cache line is copied to the cache, a cache entry is created (i.e., placed in the cache), which includes the copied data and the requested memory address (e.g., a tag). If the tag is located in the cache, a cache hit occurs and the data is accessed in the cache line. If the tag is not in the cache, a cache miss occurs. A new entry is allocated to the cache, data from the larger memory is copied to the cache and the data is accessed. Existing entries may be replaced (e.g., evicted) by new entries according to different mapping policies, which include direct mapping and associative mapping.

BRIEF DESCRIPTION OF THE DRAWINGS

A more detailed understanding can be had from the following description, given by way of example in conjunction with the accompanying drawings wherein.

DETAILED DESCRIPTION

Figure 1:
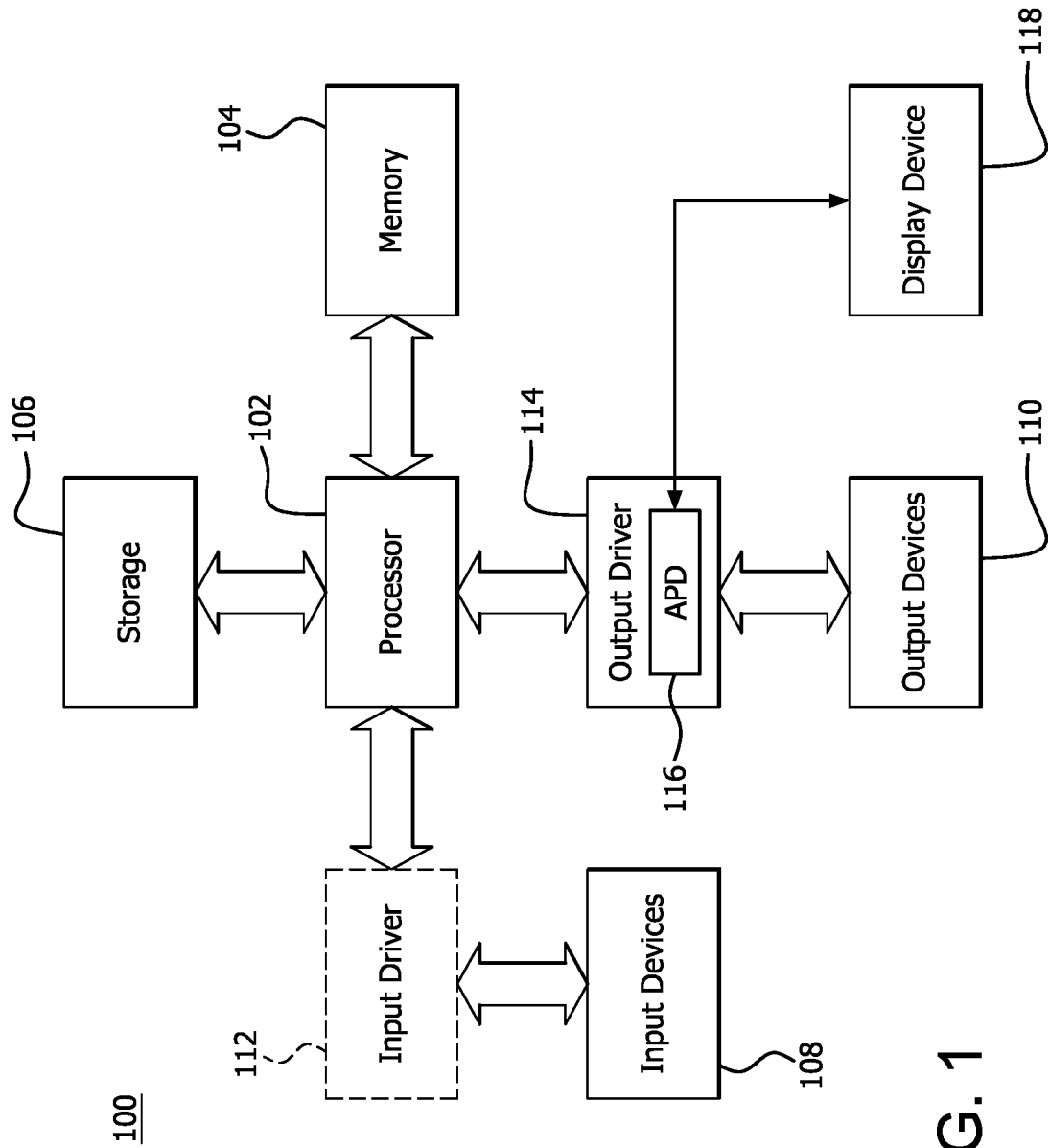
FIG. 1 is a block diagram of an example device in which one or more features of the disclosure can be implemented.

Caches which are closer to the processor (e.g., processor core) that is requesting access to data are more latency sensitive than other portions of memory (e.g., higher level caches and main memory). That is, efficient execution of a program typically relies on returning requested data in these caches (e.g., level 1 (L1) and L2 cache) faster than returning requested data in other portions of memory. In addition, these caches are also configured with fixed cache hit latencies (i.e., data is returned to the processor in a fixed number of clock cycles or time from when the data is requested by the processor).

Data is accessed more quickly from these latency sensitive caches if there is less of the cache to search (i.e., smaller cache size) through by the processor. Increasing the amount of data that can be stored in the cache (i.e., larger cache size), however, increases the probability of requested data being in the cache (i.e., increases the probability of cache hit). That is, there is a fundamental tradeoff between decreasing cache size (decreasing storage capacity) to more quickly access data and increasing the cache size to increase the cache hit rate. Accordingly, there is a continuing effort in cache design to more quickly access data from caches while maintaining a sufficient cache hit rate.

One way conventional caches address fundamental tradeoff is by utilizing an N-way set associative mapping policy in which each cache entry is allocated to a set containing N number of cache lines, where each line in a set can hold the data for any tag and each line of a set is stored in one of N number of slots in the cache. For set associative caches, the larger the N number of lines in an N-way set associative policy, the greater the associativity and the lower probability for cache misses. The increase in associativity, however, includes an increase in the N number of lines and addresses to search, resulting in increased latency, more power consumption and a larger storage area.

Data is typically accessed in a cache by looking up the tag in a tag portion of the cache and then reading out the data, corresponding to the tag, from a location in a data portion of the cache that is adjacent the tag portion of the cache. Because some locations in the data portion of the cache are located further from the tag portion of the cache than other locations in the data portion of the cache, the cache hit latency (i.e., the number of clock cycles or time from when data is requested by the processor to when the data is returned (e.g., loaded to registers) to the processor) can vary for data stored at different locations in the data portion of the cache.

A processor can execute a program more quickly by saturating the data pipeline and completing operations (e.g., fetch, decode, load, execute) at each clock cycle. Collisions in a data pipeline can occur, however, when multiple operations are performed, at different stages of a pipeline, using the same shared hardware. When the cache hit latency of requested data is different than the cache hit latency expected by the processor (i.e., an expected amount of clock cycles or time incurred from when data is requested by the processor to when the data is returned to the processor), the unexpected latency can cause pipeline collisions, resulting in data corruption and negatively impacting performance during execution of a program. Efficient execution of a program is, therefore, facilitated by returning requested data to the processor according to the cache hit latency that is expected by the processor. Accordingly, conventional caches use state delay logic (e.g., flip flops) in the cache (e.g., slots of the cache) to provide a uniform cache hit latency in which the cache hit latency is the same for data stored at each location in the data portion of the cache, relative to the tag portion of the cache. That is, the cache is controlled such that data, at each location in the data portion of the cache, is returned to the processor at the same expected number of clock cycles from when the data is requested by the processor. Performance can be improved during execution of a program by using mixed latency, in which the fixed cache hit latency of data at some locations of the cache is different than the fixed cache hit latency of data at other locations of the cache. That is, more frequently accessed data is stored at locations in the cache in which a cache hit latency is less than other locations in the cache. Accordingly, mixed latency can improve the overall performance because more frequently accessed data can be returned to the processor more quickly than less frequently accessed data.

As described above, however, efficient execution of a program is also facilitated by accessing requested data according to a cache hit latency that is expected by the processor (i.e., an expected cache hit latency). That is, when the processor requests data, the processor expects that requested data stored in the cache (e.g., L1 or L2 cache or other caches configured with fixed cache hit latencies) will be returned in a number of clock cycles from when the request is made. The processor is not aware of where (i.e., the location) the requested data is stored in a mixed latency cache, however, and in some cases, requested data can be stored at a location (e.g., a slot) in the cache such that the actual cache hit latency for the requested data is different than the expected cache hit latency for the requested data, which can negatively impact the overall performance during execution of a program.

For example, in an 8-way associative mixed latency cache, the processor searches for the tag (i.e., the requested memory address) corresponding to the requested data at a tag portion of the cache. The requested data, corresponding to the tag, can then be read from a location (e.g., one of 8 slots allocated to the set) in the data portion of the cache in which the cache hit latency is greater than the cache hit latency from another location (e.g., another one of the 8 slots). Because the processor is not aware of the greater cache hit latency at the time that the data is requested, the overall performance can be negatively impacted.

Features of the present disclosure provide devices and methods which access data from a cache at locations having different cache hit latencies while indicating the different cache hit latencies to the processor such that the processor is aware of the different cache hit latencies when the processor requests data. The devices and methods disclosed herein provide the advantages associated with a mixed latency cache while avoiding the inefficiencies incurred by mixed cache hit latency. Feature of the present disclosure decrease the cache hit latency for a portion of a cache without reducing the storage capacity of the cache.

A method of accessing data is provided which comprises requesting access to the data, in memory, which corresponds to a memory address. The memory address includes an identifier that identifies a first data section of a cache. The first data section of the cache has a first cache hit latency that is different from a second cache hit latency of a second data section of the cache. The method also comprises loading the requested data, determined to be located in the first data section of the cache, according to the first cache hit latency of the first data section of the cache.

A processing device is disclosed which comprises a cache and a processor. The cache comprises a first data section having a first cache hit latency and a second data section having a second cache hit latency that is different from the first cache hit latency of the first data section. The processor is configured to request access to data in memory which corresponds to a memory address. The memory address includes an identifier that identifies the first data section of the cache. The processor is also configured to load the requested data, determined to be located in the first data section of the cache, according to the first cache hit latency of the first data section of the cache.

A non-transitory computer readable medium is provided which comprises instructions for causing a computer to execute a method of accessing data. The instructions comprise requesting access to the data, in memory, which corresponds to a memory address. The memory address includes an identifier that identifies a first data section of a cache. The first data section of the cache has a first cache hit latency that is different from a second cache hit latency of a second data section of the cache. The instructions also comprise loading the requested data, determined to be located in the first data section of the cache, according to the first cache hit latency of the first data section of the cache.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM (DRAM), or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
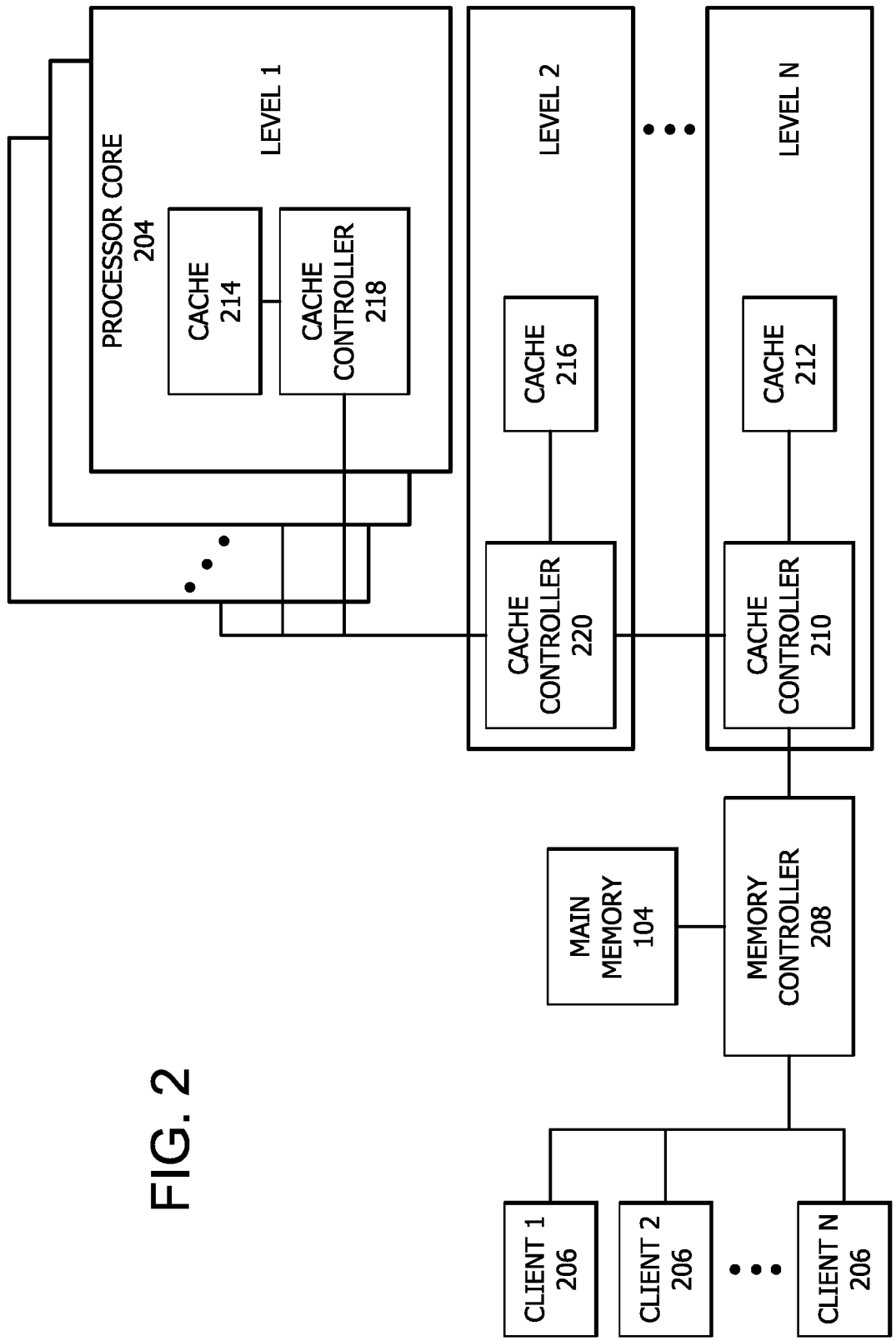
FIG. 2 is a block diagram illustrating example components for implementing one or more features of the disclosure.

FIG. 2 is a block diagram illustrating example components for implementing one or more features of the disclosure. Some components shown in FIG. 2 are, for example, components of a processor, such as an accelerated processor (e.g., GPU). Features of the disclosure can be executed by one or more processors of a first type, such as a CPU, and/or one or more processors of a second type, such as a GPU.

As shown in FIG. 2, components include a plurality of processor cores 204. The processor cores 204 can include, for example, various components (e.g., a scheduler and a load-store unit) for scheduling and executing all load and store instructions, such as loading data from memory (e.g., cache memory or main memory) to registers of the processor core 204 and storing the data back from the registers back to memory.

Each core 204 includes a corresponding level 1 cache controller 218 in communication with a corresponding level 1 cache 214 and configured to process data using the corresponding level 1 cache 214. As further shown in FIG. 2, components also includes a level 2 cache controller 220/processor in communication with level 2 cache 216 and configured to process data using level 2 cache 216. Cache controller/processor 220 is also in communication with a next cache level (higher cache level). Any number of N level caches can be used. The next level cache, such as N level cache 212 (e.g., last level cache) and N level cache controller 210 can be in communication with and shared by caches of multiple processors, such as for example, caches of a CPU or GPU (not shown), which may be located on the same die, or multiple dies.

Caches (e.g., L1 cache 214 and L2 cache 216) which are closer to the processor core 204, which requests access to data, are more latency sensitive than other portions of memory (e.g., higher level caches and memory 104). Accordingly, these caches (e.g., L1 cache 214 and L2 cache 216) are configured with fixed cache hit latencies (i.e., data is returned to the processor 204 in a fixed number of clock cycles or time from when the data is requested by the processor 204). Features of the disclosure can be implemented using any caches that are configured with fixed latencies.

Memory controller/processor 208 is in communication with memory 104 (e.g., DRAM) and cache controllers 220 and 218. As shown in FIG. 2, multiple clients 206 are also in communication with memory controller 208. When a client 206 requests a portion of memory to be allocated, memory controller 208 is configured to receive and service requests, from client 206 (e.g., display client) and access cache 216 via cache controller 220 and cache 214 via cache controller 218. Memory controller/processor 208 is configured to receive requests from clients 206, allocate memory, control access to one or more caches (e.g., last level cache 212) and various other functions described herein.

Figure 3:
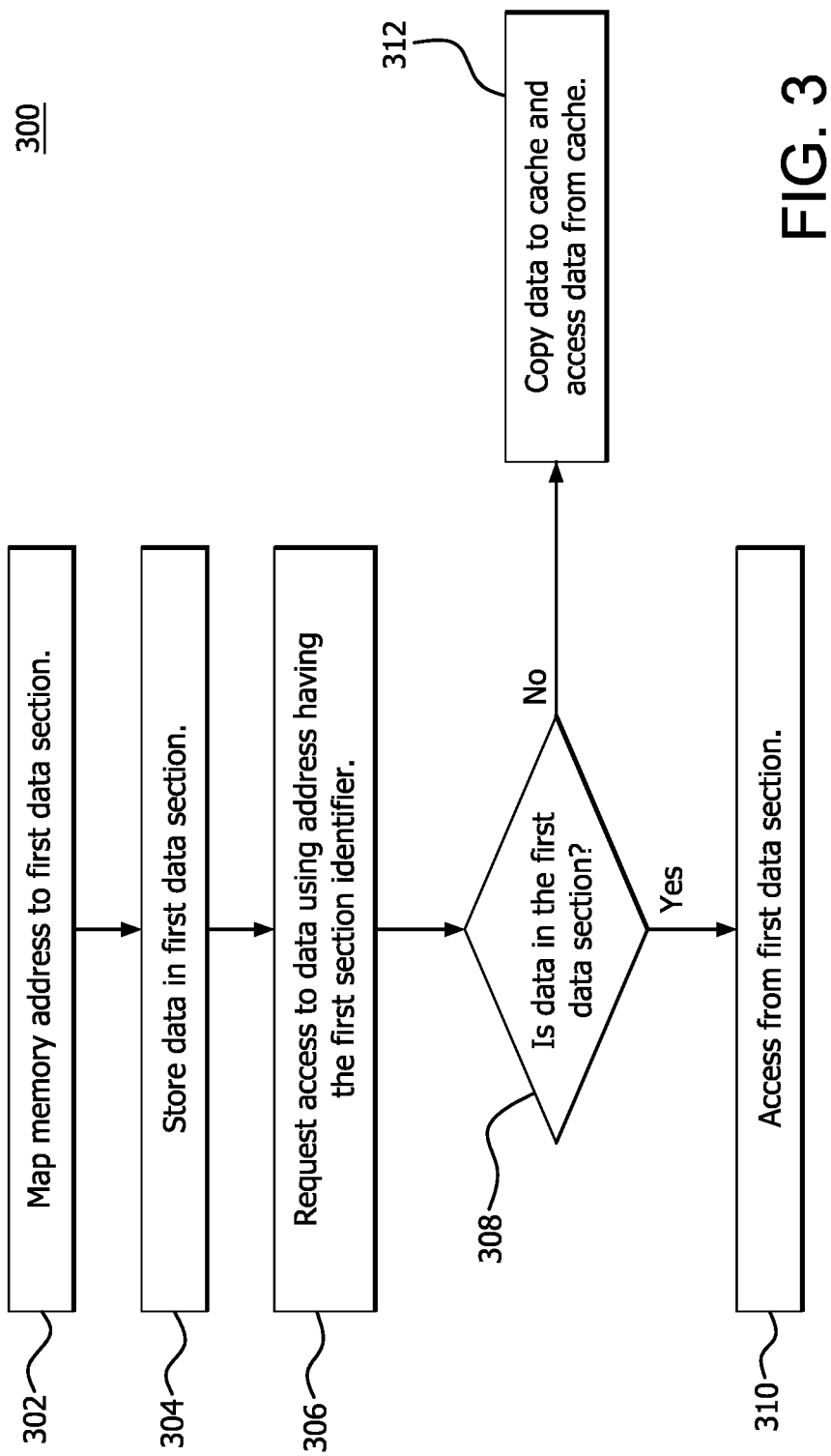
FIG. 3 is a flow diagram illustrating an example method of accessing data according to features of the present disclosure.
Figure 4:
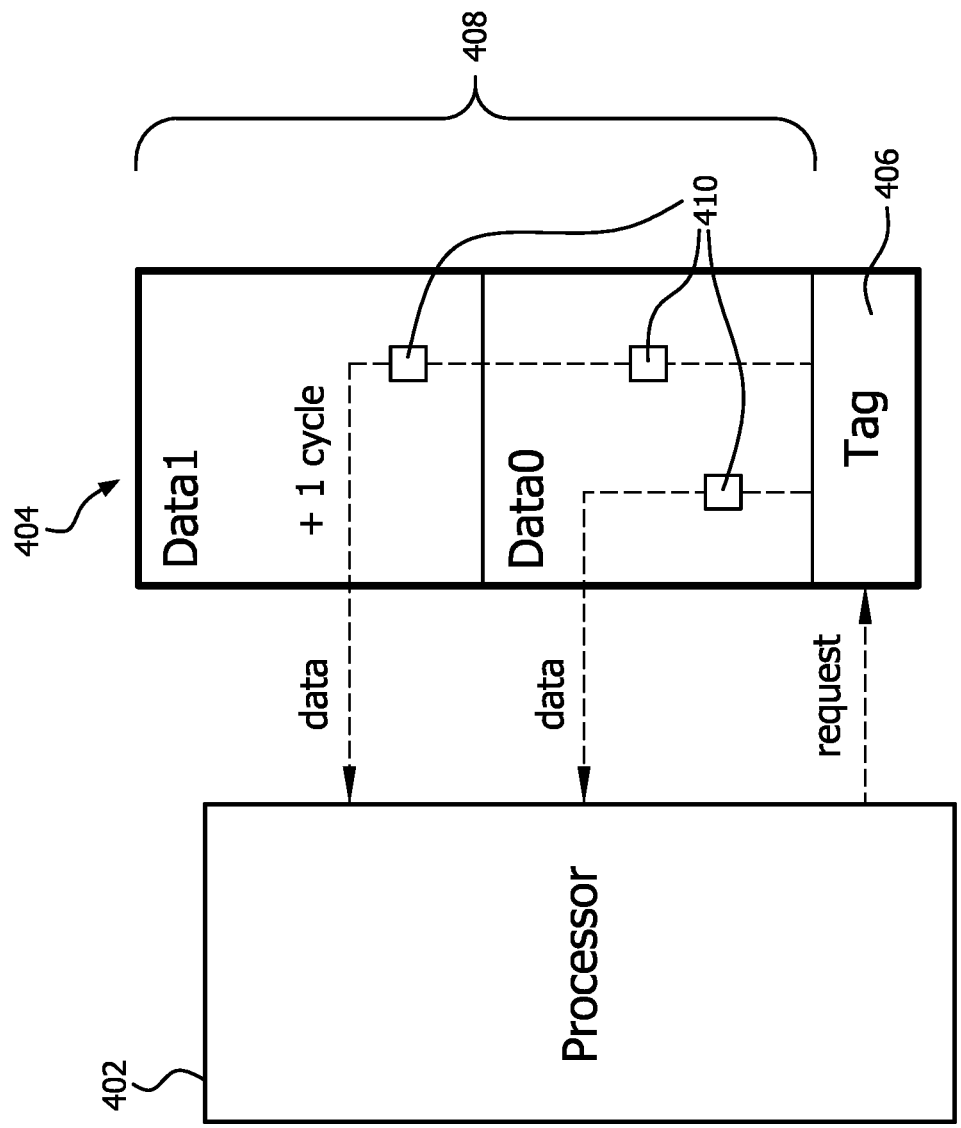
FIG. 4 is a block diagram illustrating a flow of accessing an example cache according to features of the present disclosure.

FIG. 3 is a flow diagram illustrating an example method 300 of accessing data according to features of the present disclosure. FIG. 4 is a block diagram illustrating a flow of accessing an example cache 402 according to features of the present disclosure. FIGS. 3 and 4 are used together to illustrate the example method 300 of accessing the data.

FIG. 4 includes a processor 402 and a cache 404. The processor is, for example, a processor core (e.g., processor core 204 shown in FIG. 2) of an accelerated processor (e.g., a GPU). The cache 402 is, for example, an L1 cache (e.g., cache 216 shown in FIG. 2) or an L2 cache (e.g., cache 212 shown in FIG. 2). As shown in FIG. 4, the cache includes a tag portion 406 and a data portion 408. The data portion 408 of the cache 402 includes two separate data sections, namely a Data0 section and a Data1 section, each configured to store a plurality of data (e.g., cache lines) associated with a tag in the tag portion 406.

The Data0 section is located closer to the tag portion 406 than the Data1 section. In the example shown in FIG. 4, the cache 404 is configured such that the cache hit latency of the Data0 section, located closer to the tag portion 406, has a cache hit latency that is less than the cache hit latency of the Data1 section. For example, each data section (Data0 section and Data1 section) is configured with a fixed cache hit latency. But the cache 404 can include one or more additional state delay components 410 (e.g., flip flops), which are used to temporarily hold data and release the data on a next clock cycle, in a slot for accessing data in the Data1 section than the slot for the Data0 section such that the data stored in the Data0 section is returned to the processor 402 in a smaller number of clock cycles (e.g., 1 cycle), from when the data is requested by the processor 402, than the data in the Data1 section. Accordingly, more frequently accessed data can be stored in the Data0 section and returned to the processor 402 more quickly.

The number of separate data sections shown in FIG. 4 is merely an example. Features of the present disclosure can be implemented, however, using more than two data sections in which at least two data sections have different cache hit latencies. In addition, in the example shown in FIG. 4, the cache hit latency of the data section (Data0 section) that is located closer to the tag portion 406 is configured with a smaller cache hit latency. Features of the present disclosure can be implemented, however, using a cache having a data section, located further from the tag portion 406 than another data section, that is configured with a smaller cache hit latency than the other data section located closer to the tag portion 406.

Referring to FIG. 3, as shown at block 302, the method 300 includes mapping a memory address to a first data section of a cache by adding, to the memory address, an identifier that identifies the first data section of a cache. As shown at block 304, the method 300 includes storing the data in the first data section of the cache at the address having the identifier that identifies the first data section.

For example, when data is stored in the cache 404, the address corresponding to the data is mapped to an address of one of the data sections (Data0 section or Data1 section). The address is for example, hardcoded in the cache data and the mapping is performed at compiling. Alternatively, the address is configurable and the mapping is performed at runtime. In either example, the processor and the cache/cache controller use the same translation, such that the processor is aware of how addresses are mapped to the different data sections.

That is, the memory address is mapped to an address of one of the data sections such that the memory address, which is used by the processor to request data, includes an identifier (i.e., one or more bits) in the memory address, corresponding to the data, which identifies the data section in which the data is stored. In the example shown in FIG. 4, the data portion 408 of the cache 404 includes two data sections (i.e., Data0 section and Data1 section). Accordingly, a single bit (e.g., the least significant bit) can be used to identify one of the two data sections (Data0 section or Data1 section) in which the data is stored. For example, when the least significant bit of the address is 0, the data is stored in the Data0 section and when the least significant bit of the address is 1, the address is stored in the Data1 section.

The number of separate data sections shown in FIG. 4 is merely an example. Features of the present disclosure can be implemented, however, using more than two data sections having different cache hit latencies. In addition, more than 1 bit can be used to identify a data section if a cache includes more than two data sections having different cache hit latencies. For example, if a cache includes four data sections having different cache hit latencies, the two least significant bits can be used to identify the four different data sections.

Referring again to FIG. 3, as shown at block 306, the method 300 includes requesting access to the data using the address having the identifier which identifies the first data section.

In addition to determining, via the identifier which identifies the data section, that the data was previously stored in one of the data sections (Data0 section or Data1 section) of the cache 404, the processor 402 is also aware of the fixed cache hit latencies of each data section. The latency of each data section is defined in the hardware design of the corresponding section such that the processor is aware of which data section will return the requested data. Because the hardware design of each data section is a static property of the hardware comprising each data section, the processor is similarly aware of when to anticipate the data being returned and can schedule access requests accordingly. That is, processor 402 is aware of the fixed number of clock cycles that the data in the Data0 section will be returned (i.e., loaded to the registers) and the number of clock cycles that the data in the Data1 section will be returned prior to executing a program and, therefore, prior to requesting any data during execution of the program.

Accordingly, when the processor sends a request for the data, which includes the address that is mapped to the Data0 section or the Data1 section, the processor is aware that data will be returned in the number of clock cycles associated with the fixed cache hit latency of Data0 section or the fixed cache hit latency of Data0 section Data1 section.

For example, during execution of a program, the processor may request access to data via a stream of instructions, such as for example, loading the data of address 0 to register 1 (1d r1, 0xf0), loading the data of address 1 to register 2 (1d r2, 0xf1), adding the data in register 1 (the data from address 0) to the data in register 2 (the data from address 1) and loading the resulting product in register 0 (add r0, r1, r2). The processor determines, prior to sending the request for the data in address 0 and the data in address 0, that address 0 and address 1 were both previously mapped to the Data0 section. Accordingly, when the processor requests the data in address 0 and the data in address 1, the processor is aware that the data in address 0 and the data in address 1 will be returned according to the cache hit latency of the Data0 section (i.e., loaded to the registers at an identified fixed number of clock cycles from when the data is requested by the processor 402).

As shown at decision block 308, the method includes determining whether the requested data is the first data section (Data0 section). That is, the processor searches for the tag (i.e., the requested memory address) corresponding to the requested data at the tag portion 406 of the cache 404. When it is determined, at decision block 308, that the tag (i.e., memory address corresponding to the requested data) is located in the tag portion 406 of the cache 404, a cache hit occurs and the data is accessed from the first data section (Data0 section) at block 310.

That is, the requested data, corresponding to the tag, can then be read from a location (e.g., one of 8 slots allocated to the set) in one of the slots in the Data0 section of the cache 404 in which the cache hit latency is less than the cache hit latency of the Data1 section. In addition to the data being accessed more quickly, because the processor 402 is aware, via the identifier in the memory address, of the cache hit latency of the Data1 section at the time that the data is requested, the overall performance is improved.

When it is determined, at decision block 308, that the tag is not located in the tag portion 406 of the cache 404, a cache miss occurs. A new entry is allocated to the cache 404, the data is copied to the cache 404 from another portion of memory (e.g., a next level cache or main memory) and the data is accessed at block 312. Any existing entries may, or may not, be replaced (e.g., evicted) by the new entry according to the mapping policy.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, 204, 402, the input driver 112, the input devices 108, the output driver 114, the output devices 110, the accelerated processing device 116, memory controller/processor 208, caches 212, 214, 216, 404 and the cache controller/processors 210, 218 and 220 may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:
1. A method of accessing data, the method comprising;
   requesting access to the data based on a first cache hit latency, responsive to the data corresponding to a memory address which includes an identifier that identifies a first data section of a cache;
   scheduling a data pipeline based on a first number of clock cycles from when access to the data was requested, wherein the first number of clock cycles is determined based on the identifier; and loading the requested data according to the first cache hit latency;

wherein the first cache hit latency is different from a second cache hit latency of a second data section of the cache.

2. The method of claim 1, further comprising: determining, prior to requesting the data, that the data was previously stored in the first data section of the cache using the identifier that identifies the first data section of the cache.

3. The method of claim 1, wherein the identifier includes one or more bits of the memory address.

4. The method of claim 1, wherein the first cache hit latency of the first data section of the cache is less than the second cache hit latency of the second data section of the cache.

5. The method of claim 1, wherein the first cache hit latency is a first number of clock cycles from when the data was requested, the second cache hit latency is a second number of clock cycles from when the data was requested, and the first number of clock cycles is less than the second number of clock cycles.

6. The method of claim 1, wherein the first data section of the cache is located closer to a tag portion of the cache than the second data section of the cache, the tag portion of the cache comprising the memory address which includes the identifier that identifies the first data section of the cache.

7. The method of claim 1, further comprising: mapping the memory address to the first data section of the cache by adding, to the memory address, the identifier that identifies the first data section of a cache; and storing the data in the first data section of the cache at the memory address which includes the identifier.

8. A processing device comprising;
cache circuitry comprising:
a first data section having a first cache hit latency, and
a second data section having a second cache hit latency that is different from the first cache hit latency; and
processing circuitry configured to:
request access to data based on a first cache hit latency, responsive to the data corresponding to a memory address which includes an identifier that identifies the first data section of the cache circuitry, and schedule a data pipeline based on a first number of clock cycles from when access to the data was requested, wherein the first number of clock cycles is determined based on the identifier; and
load the requested data according to the first cache hit latency;
wherein the first cache hit latency is different from a second cache hit latency of a second data section of the cache circuitry.

9. The processing device of claim 8, wherein the processing circuitry is configured to determine, prior to requesting the data, that the data was previously stored in the first data section of a cache using the identifier that identifies the first data section of the cache.

10. The processing device of claim 8, wherein the identifier is a bit of the memory address which is used to identify the first data section and the second data section.

11. The processing device of claim 8, wherein the cache circuitry further comprises a third data section having a third cache hit latency that is different from the first cache hit latency of the first data section and the second cache hit latency of the first data section, and the identifier includes a plurality of bits of the memory address which are used to identify the first data section, the second data section and the third data section.

12. The processing device of claim 8, wherein the first cache hit latency of the first data section of the cache is less than the second cache hit latency of the second data section of the cache.

13. The processing device of claim 8, wherein the first cache hit latency is a first number of clock cycles from when the data was requested, the second cache hit latency is a second number of clock cycles from when the data was requested, and the first number of clock cycles is less than the second number of clock cycles.

14. The processing device of claim 8, wherein the cache circuitry further comprises a tag portion which comprises the memory address having the identifier that identifies the first data section of the cache circuitry, and the first data section of the cache circuitry is located closer to the tag portion of the cache circuitry than the second data section of the cache circuitry.

15. The processing device of claim 8, wherein the processing circuitry is configured to: map the memory address to the first data section of the cache circuitry by adding the identifier, that identifies the first data section of a cache circuitry, to the memory address; and store the data in the first data section of the cache circuitry at the address having the identifier.

16. The processing device of claim 8, wherein the processing circuitry comprises registers, and the processing circuitry is configured to load the requested data, determined to be located in the first data section of the cache circuitry, to the registers in a first number of clock cycles from when the data was requested.

17. A non-transitory computer readable medium comprising instructions for causing a computer to execute a method of accessing data, the instructions comprising:
requesting access to the data based on a first cache hit latency, responsive to the data corresponding to a memory address which includes an identifier that identifies a first data section of a cache;
scheduling a data pipeline based on a first number of clock cycles from when access to the data was requested, wherein the first number of clock cycles is determined based on the identifier; and
loading the requested data according to the first cache hit latency;
wherein the first cache hit latency is different from a second cache hit latency of a second data section of the cache.

18. The non-transitory computer readable medium of claim 17, wherein the instructions further comprise:
determining, prior to requesting the data, that the data was previously stored in the first data section of a cache using the identifier that identifies the first data section of the cache.

19. The non-transitory computer readable medium of claim 17, wherein the identifier includes one or more bits of the memory address.

20. The non-transitory computer readable medium of claim 17, wherein the first cache hit latency of the first data section of the cache is less than the second cache hit latency of the second data section of the cache.

* * * * *